United States Patent [19]

Alexander et al.

[11] Patent Number: 4,749,934

[45] Date of Patent: Jun. 7, 1988

[54] INTRINSICALLY SAFE BATTERY CIRCUIT

[75] Inventors: Richard Alexander; Dennis Kindschuh, both of Mason City, Iowa

[73] Assignee: Alexander Manufacturing Company, Mason City, Iowa

[21] Appl. No.: 926,201

[22] Filed: Nov. 7, 1986

[51] Int. Cl.⁴ .......................... H02J 7/00; H02H 9/02
[52] U.S. Cl. ........................................ 320/13; 320/35; 361/13; 361/93; 361/101
[58] Field of Search ................ 320/13, DIG. 1, 31, 320/35; 361/3, 13, 93, 101; 323/908

[56] References Cited

U.S. PATENT DOCUMENTS

| | | | |
|---|---|---|---|
| 3,967,169 | 6/1976 | Ellenberger | 320/36 X |
| 4,161,773 | 7/1979 | Szpakowski | 323/908 X |
| 4,271,460 | 6/1981 | Baker | 361/13 X |
| 4,438,473 | 3/1984 | Cawley et al. | 361/101 X |
| 4,555,741 | 11/1985 | Masaki | 323/908 X |
| 4,634,936 | 1/1987 | Gentry et al. | 361/93 X |
| 4,638,396 | 1/1987 | Mukli et al. | 361/93 X |

Primary Examiner—R. J. Hickey
Attorney, Agent, or Firm—Hugh D. Jaeger

[57] ABSTRACT

An intrinsically safe battery circuit for connection between a battery and a load, such as a hand held transceiver, referred to as "HT's". The circuit includes a minor current path through a switching transistor and a major current path through a SCR. The circuit is a hybrid circuit which includes an integrated circuit timer which provides a delay in establishing the major current path subsequent to the minor current path being established, and mounts on a small printed circuit board.

5 Claims, 3 Drawing Sheets

INTRINSICALLY SAFE BATTERY CIRCUIT

BACKGROUND OF THE INVENTION

1. Field of the Invention

The present invention pertains to an intrinsically safe battery circuit, and more particularly, to an intrinsically safe battery hybrid circuit which prevents arcing and allows full current from the battery during operation.

2. Description of the Prior Art

An intrinsically safe battery is defined as a cell pack whose energy is limited to a point so as not to cause ignition as properly used in various atmospheres. The atmospheres considered dangerous are divided into several groups, and the groups are determined by the amount of energy required to cause ignition.

A regulatory agency most recognized in the United States is Factory Mutual ("FM"). FM in an insurance company specializing in hazardous applications. All testing is dictated and conducted on site at FM. Any damage or injury occurred in an accident involving a battery or other equipment not "FM Approved" voids Factory Mutual's liability. For this reason, customers insist on "FM Approved" batteries which are intrinsically safe.

Testing involves a variety of dielectric and physical construction checks. These checks are intended to insure the stability of the components used or limit the energy from the cells. Electrical testing is conducted on a spark generator.

A chamber is constructed which is air tight and includes a viewing window. Inside, a random spaced circular set of contact pins, resembling nails, are attached to one terminal of the battery. The other terminal attaches to a rotating arm whose tip contacts the contact pins. This essentially makes and breaks the circuit to the battery under test. Arcs are created inside the chamber, and these arcs are representative of the energy available from the battery. The different atmospheres are then pumped into the chamber and checked for ignition.

In the prior art, the most common method of making a battery intrinsically safe has been to simply add enough series resistance to limit the energy to a safe level. This has worked well except for higher voltage cell packs such as 12 volts and over. These batteries of a larger voltage require a large value resistance at a high wattage that is physically difficult, and not acceptable to locate internally in the battery.

The present invention overcomes the disadvantages of the prior art by providing a hybrid circuit to prevent arcing, which passes all electrical tests and allows full current from the battery.

SUMMARY OF THE INVENTION

The general purpose of the present invention is to provide an intrinsically safe battery circuit which can be a hybrid circuit, and placed inside nickel-cadmium ("nicad") batteries, also referred to as nicad packs or nicad batteries. The circuit includes a minor current path and a major current path.

According to one embodiment of the present invention, there is provided an intrinsically safe battery circuit for connection between a battery and a load, a circuit including a minor current path through a transistor and a major current path through a SCR. A timing circuit provides that when a load in place, the timing circuit provides an output signal after a predetermined time which switches a gate of a SCR to apply full power through the major current path. If a connection is broken such as removal of the battery, then another timing delay is again occurred. This avoids arcing which causes ignition.

Significant aspects and features of the present invention is an intrinsically safe battery circuit which is a hybrid circuit and can be easily located in a nickel-cadmium battery cell housing.

Another significant aspect and feature of the present invention is a hybrid circuit where the delay, when full power is applied, can be predetermined by selecting the value of the "RC" circuit across a timing integrated circuit.

A further significant aspect and feature of the present invention is a hybrid circuit which is cost effective and provides 100% reliability while also allowing full power from the battery.

Having thus described principal embodiments of the present invention, it is the principal object hereof to provide an intrinsically safe battery circuit.

One object of the present invention is to provide an intrinsically safe battery circuit which allows full current from the battery and can be physically located within the battery housing.

Another object of the present invention is to provide an intrinsically safe hybrid battery circuit.

DESCRIPTION OF THE PREFERRED EMBODIMENTS

Figure 1:
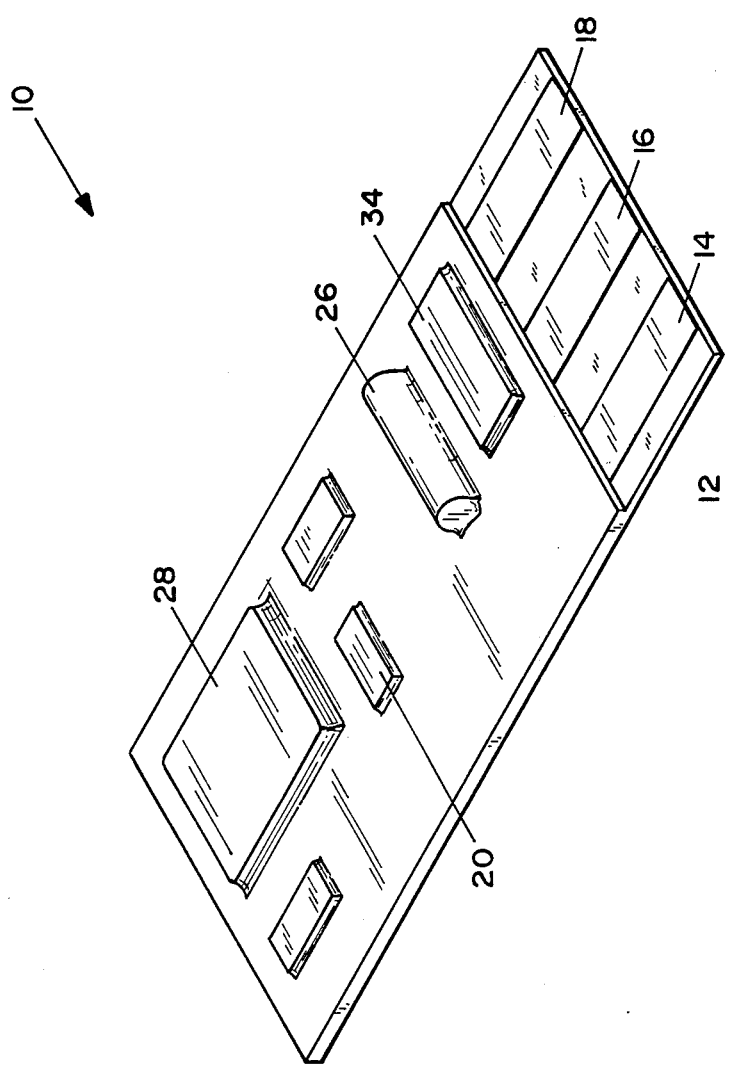
FIG. 1 illustrates a perspective view of a intrinsically safe battery circuit which is a hybrid circuit.

FIG. 1 illustrates a plan view of an intrinsically safe battery circuit 10. A printed circuit board 12 supports conductors 14, 16 and 18, and components 20–34. A battery 36 with a plurality of cells in series such as nickel-cadmium cells, and a thermal activated switch 40 such as a low resistance device which breaks the circuit at high current connects between conductors 14 and 16. A load such as a hand held transceiver or a charger connects between conductors 16 and 18.

Figure 2:
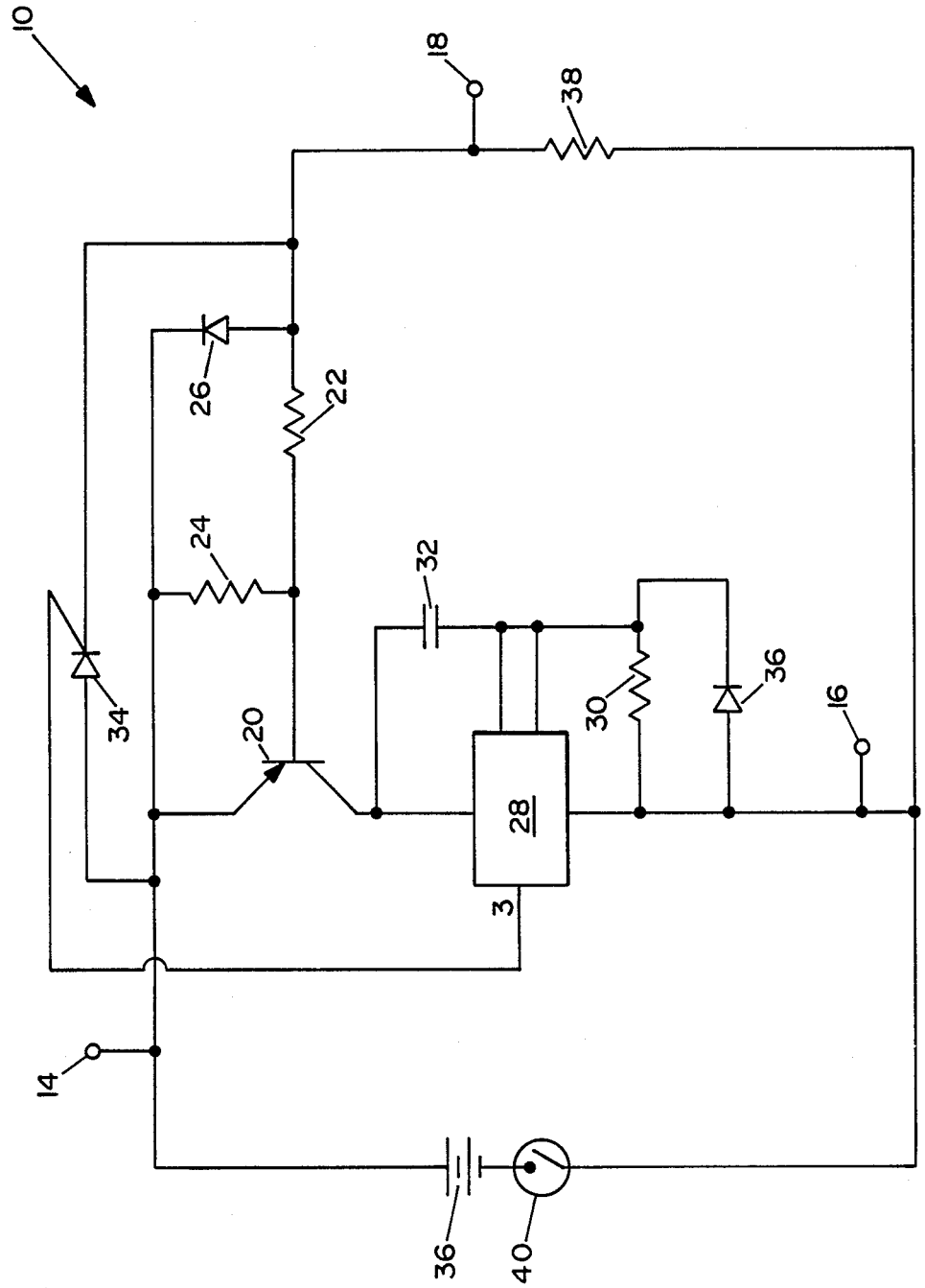
FIG. 2 illustrates an electrical circuit schematic diagram of an intrinsically safe battery circuit; and, FIG. 3 illustrates a battery housing with an intrinsically safe battery hybrid circuit secured in a battery housing with nickel-cadmium cells connected in series removed for purposes of illustration.

FIG. 2 illustrates an electrical circuit schematic where all numerals correspond to those elements previously described.

A switching transistor 20 and a biasing resistor 22 connect in series with a load providing a minor current path between the battery 36 to the load 38. Resistor 24 provides biasing to turn on transistor 20 when power is applied. Diode 26 provides a reverse current path for charging the battery from the terminals 18. During the minor limited flow of current, the IC 28, such as an integrated circuit 555 timing circuit is powered and develops a high logic signal on pin 3 after a period of time based on the value of the RC circuit of a resistor 30 and a capacitor 32. The high signal at pin 3 switches the gate of the SCR 34 energizing the major current path to the load 38. The diode 36 provides for more rapid decay of the RC timing circuit when power is removed applied to the IC 28. A low resistance thermal switch device 40 such as a poly-switch, manufactured by Ray-Chem, is inserted in series with the plurality of nickel-cadmium battery cells 36.

MODE OF OPERATION

Figure 3:
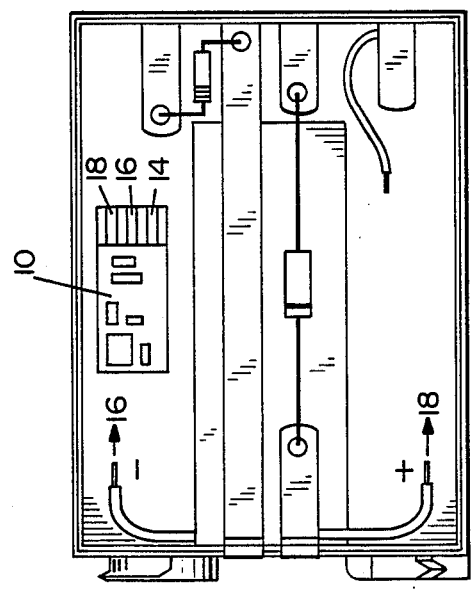

FIG. 3 illustrates a plan view of a nickel-cadmium battery pack showing the circuit 10 as a hybrid circuit physically placed and to be electrically connected in the battery pack 50 not illustrates for sake of brevity.

In operation, when the circuit 10 senses that a load is in place, the circuit waits one half second, by way of example and for purposes of illustration only before applying full power. If the load connection is broken, the one half second delay is again applicable. In this manner, arcing is avoided which would cause ignition.

Current first flows through the minor current path including the transistor 20, bias resistor 24 and the resistor 22. This turns on transistor 20 and supplies power to the integrated circuit 28. The integrated circuit 28 develops a high logic level on pin 3 one half second later. This high level triggers the gate of the SCR 34 providing a main current path to the load 38. If a continuous short is applied, the polyswitch 40 protects the battery 36 by opening up until the short is removed.

Various modifications can be made to the present invention without departing from the apparent scope thereof. The hybrid circuit 10 could be manufactured as an entirely self contained integrated circuit. The time delays are chosen by the values of the components, and can be any predetermined chose valve. The circuit may have other applications in the intrinsically safe area or other areas, and is not specifically limited to series connected cells, battery packs, or nickel-cadmium batteries.

We claim:
1. An safe battery output circuit comprising:
   a. battery means
   b. circuit means for connecting said battery means to a load means;
   c. said circuit means for connecting including a minor current path means passing current from said battery means to said load means, timing circuit means, and switch means, having a control gate means, for providing a low impedance path from said battery to a load; and,
   d. said timing circuit means including an RC network with rapid decay being connected to said minor current path means to develop an output signal after a predetermined time interval triggering said control gate means for switching in a major current path of low resistance through said switch means between said battery means and load means after said predetermined time interval.
2. Circuit of claim 1 wherein said switching means is an SCR.
3. Circuit of claim 1 wherein said timing means is a 555 integrated circuit.
4. Circuit of claim 1 including a diode connected across said resistor of said RC network to provide a reverse current path for rapid discharge of said capacitor of said RC network upon disconnection of a load.
5. Circuit of claim 1 including a current activated switch connected in series with said battery means.

* * * * *